United States Patent
Hensel et al.

(10) Patent No.: US 8,608,052 B2
(45) Date of Patent: Dec. 17, 2013

(54) HIGH-DENSITY BARCODES FOR MEDICAL CONSUMABLES

(75) Inventors: Uwe Hensel, Viernheim (DE); Hans-Peter Haar, Wiesloch (DE)

(73) Assignee: Roche Diagnostics Operations, Inc., Indianapolis, IN (US)

(*) Notice: Subject to any disclaimer, the term of this patent is extended or adjusted under 35 U.S.C. 154(b) by 40 days.

(21) Appl. No.: 13/413,111

(22) Filed: Mar. 6, 2012

(65) Prior Publication Data

US 2012/0211566 A1 Aug. 23, 2012

Related U.S. Application Data

(63) Continuation of application No. PCT/EP2010/063598, filed on Sep. 16, 2010.

(30) Foreign Application Priority Data

Sep. 17, 2009 (EP) .................................. 09170569

(51) Int. Cl.
G06F 17/00 (2006.01)

(52) U.S. Cl.
USPC ........................................................ 235/375

(58) Field of Classification Search
USPC ................................. 235/375, 462.01–462.49
See application file for complete search history.

(56) References Cited

U.S. PATENT DOCUMENTS

| | | | |
|---|---|---|---|
| 3,553,438 A * | 1/1971 | Blitz et al. | ..................... 235/454 |
| 4,288,701 A | 9/1981 | Hill | |
| 4,476,149 A | 10/1984 | Poppe et al. | |
| 5,926,556 A | 7/1999 | Douglas et al. | |
| 6,168,957 B1 | 1/2001 | Matzinger et al. | |
| 6,588,670 B2 | 7/2003 | Bukowski | |
| 7,419,098 B2 * | 9/2008 | Hyde et al. | ................ 235/462.43 |
| 8,016,199 B2 * | 9/2011 | Nunnink | ................... 235/462.42 |

FOREIGN PATENT DOCUMENTS

| | | |
|---|---|---|
| DE | 37 01 825 A1 | 7/1988 |
| DE | 39 04 052 A1 | 8/1989 |
| DE | 100 21 787 A1 | 11/2001 |
| EP | 0 814 421 A2 | 12/1997 |
| EP | 1 918 857 A2 | 5/2008 |
| WO | WO 2011/033013 A1 | 3/2011 |

OTHER PUBLICATIONS

Notification of Transmittal of Translation of the International Preliminary Report on Patentability, International Application No. PCT/EP2010/063598, Apr. 12, 2012, 8 pages.

* cited by examiner

*Primary Examiner* — Jamara Franklin
(74) *Attorney, Agent, or Firm* — Krieg DeVault LLP

(57) ABSTRACT

A medical instrument for carrying out at least one medical function is proposed, more particularly a medical instrument embodied as a hand-held instrument. The medical instrument is designed to interact with at least one medical consumable in order to carry out the medical function. The medical instrument has at least one code reader for reading out at least one item of information from an optical code of the medical consumable. The code reader comprises at least one image sensor. The code reader furthermore comprises at least one areal light source, which is designed to illuminate the optical code in a transmissive fashion.

50 Claims, 5 Drawing Sheets

HIGH-DENSITY BARCODES FOR MEDICAL CONSUMABLES

CROSS-REFERENCE TO RELATED APPLICATIONS

This application is a continuation of International Application No. PCT/EP2010/063598 filed Sep. 16, 2010, which claims priority to EP Application No. 09170569.9 filed Sep. 17, 2009. Each of the referenced applications is incorporated herein by reference in its entirety.

FIELD OF THE INVENTION

The invention relates to a medical instrument, which is designed to carry out at least one medical function. The medical instrument is furthermore designed to interact with at least one medical consumable in order to carry out the medical function. By way of example, such medical instruments are used in the field of medical analysis, medical diagnostics or medical therapeutics.

BACKGROUND

The use of medical consumables plays an essential role in the field of medicine and medical technology. Thus, for example, medical instruments are often used in medical diagnostics and analysis, and in medical therapeutics, and these instruments often have e.g. a diagnostic, analytic or therapeutic function, or combinations of these functions, and require one or more medical consumables to carry out this function. The medical consumables and the medical instrument together form a medical system. Here the medical consumables need not necessarily be physically connected to the medical instrument.

Examples of such medical systems and medical instruments include medical analysis instruments, which are used for quantitative and/or qualitative detection of at least one analyte in a sample, for example for detecting one or more metabolites in a bodily fluid. As an exemplary application, reference is made here to glucose measuring instruments for determining a glucose content in a bodily fluid, for example in blood, interstitial fluid, saliva or urine. Such analysis instruments, or other analysis instruments, generally use one or more test elements, which can be used for the quantitative and/or qualitative detection of the analyte. By way of example, these test elements can comprise one or more test fields, which carry out a specific reaction that can be detected by chemical or physical means when they come into contact with the analyte, or which test fields experience a specific, measurable change. Accordingly, the analysis instruments can be designed to determine the analyte concentration qualitatively and/or quantitatively in an optical, electrochemical or other fashion by using the test elements. By way of example, the test elements can be available as test tubes, test strips, test tapes, test wheels with test fields arranged on an upper side and/or on a circumference, foldable test papers with a plurality of test fields, or else in a different form. Here, the test elements can be available individually or else, for example, in large numbers in one or more magazines, wherein, in the latter case, the magazine itself can also be embodied as a consumable.

Lancet systems are another example of such medical systems with consumables; here a piercing aid for example acts as a medical instrument. This piercing aid is generally designed to perforate a skin section of a patient by means of one or more consumables in the form of lancets, for example in order to produce a sample of blood or interstitial fluid.

Medication systems with metering devices are further examples of medical systems, medical instruments and medical consumables. Such metering devices generally interact with at least one medical consumable or even with many types of medical consumables. Thus, for example, cartridges or other storage vessels of medicament can be used, which are metered by means of the metering device. In this case, the medicament itself and/or the medicament with the corresponding vessel (e.g. the cartridge) can be considered to be a consumable. Medication pumps, for example insulin pumps, are examples of such metering devices. However, these metering devices generally also require further types of medical consumables, more particularly catheters or similar medical consumables.

Many further types of medical systems of this type, with a medical instrument and at least one consumable, are known. Here, the consumables can also be present in combination, and so one or more consumables of one variety can also be connected to one or more consumables at least of a further variety. Medical consumables can be available individually or else as a magazine of individual elements.

In practice, a challenge for such medical systems consists of the fact that the medical instrument, in order to carry out the medical function thereof, requires information, which can change, in order to be able to interact correctly with the consumable. Thus, for example, the test elements can differ between batches, and so batch-specific information can be required for the correct evaluation of the quantitative and/or qualitative detection of the at least one analyte in the sample. By way of example, this can be or contain an item of information relating to how the optical luminescence or absorption properties, i.e. the luminescence and/or color of a test field on a test element, changes with the analyte concentration. Alternatively, or in addition thereto, this can also include electrochemical evaluation information. Here, for example, current profiles and/or electric potentials are measured.

By way of example, in the case of lancet systems, for example lancet systems with consumables in the form of a lancet magazine with a plurality of lancets or in the form of an individual lancet, a piercing aid can require information in respect of whether a legitimate type of consumable was inserted into the piercing aid, for example a lancet from a legitimate producer or of the legitimate type. In general, such information in this type of consumable or in other types of consumables can for example also be used for fraud prevention, in order to distinguish between articles from a legitimate or authorized producer and "faked" consumables. In addition to avoiding economic damages, the latter can greatly reduce the risk of health-related damages from faked medical products.

In the case of medical systems with at least one therapeutic function, for example a medication function, too, the medical instrument generally requires specific information for the correct interaction with the at least one medical consumable. By way of example, in the case of medical systems with at least one metering device, for example insulin pumps, information in respect of the type and/or the content of a cartridge of a medicament can be required. If use is made of consumables such as catheters and/or cannulae in order to meter the medicament, e.g. a filling volume of such a consumable, e.g. a filling volume of the catheter, can be necessary for ensuring correct initial filling or priming of the catheter.

These are merely a few examples of information that can or must be interchanged in such medical systems. There are various options in the prior art for solving this problem.

By way of example, a first option consists of realizing the information by entering a code number or a similar code into the medical instrument of the medical system. However, here a user is subjected to the necessity of undertaking an additional operative action that has to be carried out correctly. This can lead to an incorrect association between the code and the utilized consumable. Furthermore, the utilized code has the lowest information density and therefore generally does not contain comprehensive information in respect of the properties of the utilized consumable.

Furthermore, there is the option of attaching an information carrier to each batch of new consumables, for example each batch of new test elements; by way of example, this is implemented in conventional glucose measuring instruments. By way of example, this can be a so-called ROM key, which can, for example, be added to each pack. The user is required to enter this ROM key into the analysis instrument before using the new batch such that the correct information can be used for evaluating the measurement. An advantage of this technique consists of the fact that there can be a relatively high information density. However, since the ROM key must be used as an additional data carrier, this method is generally not very cost effective. Moreover, this method also once again asks for an additional operative action by the user, and it is not possible to ensure a unique association with the utilized consumable. There is a risk, particularly in the case of elderly patients or children, that the ROM key is not replaced when a new batch of e.g. test strips is used. Since this can lead to incorrect measurement results being output, this can have consequences in respect of erroneous medication based on the incorrect measurement results.

Thus, the prior art has also disclosed various medical systems in which such an information carrier is provided directly on the consumable; i.e. it is not provided as a separate information carrier but fixedly connected to the consumable. Since these information carriers have to be designed cost effectively owing to ever increasing cost pressures in the medical field and moreover must have a very small design, known electronic information carriers such as radiofrequency labels cannot be used in many cases, at least as long as the production costs of such electronic information carriers still form a significant proportion of the overall costs of the consumable.

Thus, medical systems are known, in which two-dimensional or three-dimensional optical codes are applied to medical consumables and these can be read by a corresponding optical code reader of the medical instrument. By way of example, such systems are described in U.S. Pat. No. 6,588,670 B2. U.S. Pat. No. 4,476,149 and U.S. Pat. No. 6,168,957 also describe test strips, which are equipped with appropriate barcodes as optical codes. Reference to such optical codes can be made in an exemplary manner in the following text.

Thus, U.S. Pat. No. 4,476,149 for example describes a characterization of a consumable by means of a low-density barcode, which can be read out longitudinally. Provided that the barcode is applied directly onto the consumable and read out at the instant that the analysis or insertion method is activated, this ensures a reliable association with the consumable. The consumable itself, together with the optical code, constitutes the data carrier. However, reading a longitudinal barcode is not without problems in practice. Since a manual pulling-through method, in which the consumable in the form of a test strip is guided through the barcode reader, is not very reliable despite the specific properties of modern one-dimensional barcodes, the consumable must in general be read out in a motorized fashion. To this end, the shape of the consumable must also be limited somehow so that it can be drawn into the medical instrument. Moreover, the barcode only permits low to medium information densities. U.S. Pat. No. 6,588,670 B2 has disclosed the characterization of a consumable by means of a low-density one-dimensional barcode using a scanner integrated into the medical instrument. In this case, the barcode is on the consumable, which, although it reduces an association problem, also requires the user here to scan the consumable by means of an additional operative action.

U.S. Pat. No. 6,168,957 has disclosed a characterization by means of color information, the spectrum of which is determined. Here color information applied to the consumable is used as a reference and hence as an information carrier. However, as a result of technical limitations and the principle involved, the information content of such color information generally is comparatively low.

SUMMARY

There is disclosed herein a medical instrument and a medical system, which avoid, at least to a great extent, the disadvantages of known medical systems and medical instruments. In particular, high data density and data integrity, and also a unique association of the data information should be ensured while at the same time avoiding additional operative actions by a user, having a cost-effective implementation and having high reliability.

This is achieved by a medical instrument and a medical system with the features of the independent claims. Advantageous developments of the invention, which can be implemented individually or in combination, are illustrated in the dependent claims.

A medical instrument for carrying out at least one medical function is proposed in a first aspect of the present invention. In respect of such medical instruments, reference can be made in very general terms to the above-described prior art. As set forth above, this medical function can, in principle, be any function usually required in the field of medicine or medical technology, more particularly a diagnostic and/or analytic function and/or a therapeutic function. Here, a diagnostic function can in principle be understood to be any function directed at establishing at least one medical state of a patient. Here an analytic function can be understood to mean almost any measurement function directed at measuring one or more parameters, for example of a sample. A qualitative and/or quantitative detection of at least one analyte in a liquid, solid or gaseous sample can be mentioned here as an example. A therapeutic function can be understood to mean a function directed at influencing a body state of a patient in a targeted fashion. In general, this influence will be directed at improving the body state, i.e. healing, for example. However, other types of influencing are also possible, for example influencing for cosmetic reasons. Medications, for example dispensing medicaments by injection, can be mentioned as examples of therapeutic functions. However, in principle, other types of therapeutic functions are also possible, for example acupressure and acupuncture. Reference can be made to the above description of the prior art for further examples of medical instruments that can also be implemented within the scope of the present invention. In principle, the medical instrument can also carry out a plurality of medical functions, for example combinations of diagnostic and/or therapeutic functions. In order to carry out this at least one medical function, the medical instrument can correspondingly be embodied by one or more mechanical devices and/or one or more electronic devices and/or one or more computing devices, which are optionally designed by program-technical means.

The medical device is designed to interact with at least one consumable in order to carry out the at least one medical function. Here an interaction should be understood to mean a functional interaction in order to realize the at least one medical function. By way of example, this can be an interaction for the purpose of an analysis, therapeutics, or diagnostics. Combinations of the types of the interactions are also possible. To this end, the existence of a physical connection between the medical instrument and the consumable is not mandatory. However, such a physical connection can equally well be present, for example in the form of a mechanical and/or electric connection. Thus, the medical instrument can for example comprise a positioning device for positioning the medical consumable; this will be explained in more detail below. In general, the medical instrument can comprise a holding device and/or a receptacle- and/or positioning device, which can respectively take in or hold or position the at least one medical consumable.

The medical consumable should be designed to enable or at least to support the medical function of the medical instrument. The medical consumable can be designed to interact with the medical instrument in a complementary fashion, for example in order to ensure the analytic and/or diagnostic and/or therapeutic function. Here, the term "consumable" should in general be understood to mean an article, which can preferably be mass produced. This consumable should be interchangeable as desired, whereas the medical instrument is generally suitable for multiple use. Thus, for example, the consumable can be provided for single use or multiple uses or merely for a limited number of uses.

The medical consumable can be designed in various ways, wherein reference can in principle be made to the above-described types of consumables, which are known from the prior art and which can also be used within the scope of the present invention or can be modified according to the invention. Thus, for example, the medical instrument can comprise an analysis instrument for detecting at least one analyte in a sample, for example a liquid sample, more particularly a bodily fluid. Metabolites in the bodily fluid, e.g. glucose, cholesterol and/or similar metabolites, in particular can be considered as an analyte. By way of example, coagulation detection is also possible. The analysis instrument can be designed to interact with a medical consumable in the form of at least one test element. As illustrated above, this test element can for example be embodied as a test tube, test strip, test tape, test wheel with multiple test fields arranged on an upper side and/or on a circumference, as a foldable test paper with a plurality of test fields, or else in a different form. In this respect, reference can be made to the description above. Here, an individual test element, for example an individual test strip, can be understood as medical consumable, or else, as explained above, this can mean a plurality of test elements, which can, for example, be held in an appropriate magazine and/or housing. In the latter case, it is also correspondingly possible to consider the magazine and/or the housing, such as an interchangeable housing part, as a consumable and, as explained in more detail below, provide it with an optical code.

Alternatively, or in addition thereto, the medical consumable can also comprise one or more lancets for perforating a skin section of a patient and/or so-called microsamplers, which provide a combination of perforation and sample-taking by means of a capillary. Such lancets or microsamplers can also be available in a stored form or in a multiple form, wherein the totality of lancets, or else individual ones, and/or lancet magazines as well, can be considered to be consumables.

As another alternative or in addition thereto, the medical instrument can also comprise a metering device for metering at least one medicament and/or another therapeutic device. In particular, the medical instrument can comprise a medication pump, for example an insulin pump. In this respect too, reference can be made again to the description above. In this case, the consumable can for example comprise a catheter and/or a cannula (with these two terms being used essentially synonymously in the following description), with which the metering device interacts. Accordingly, the medical system can for example be embodied as a so-called "infusion set". Since catheters are usually delivered filled with air, they must be rinsed with a medical liquid such as e.g. an insulin infusion before being applied to and/or in the body so that the air is at least largely displaced from the catheter. The specific filling volume for the respective catheter can be an item of information that can be contained in the optical code, which is described in more detail below. By way of example, the optical code can be applied to the catheter itself or to packaging of the catheter. This can make auto-priming, i.e. an automatic priming procedure, much simpler at least.

As illustrated above, the medical instrument is designed to carry out the at least one medical function. More particularly, the medical instrument can be embodied as a hand-held instrument, i.e. as an instrument that can be held by the user by hand without the aid of transport apparatuses. In this case, the compact embodiment of the medical instrument, which will be described in more detail below, is noticeable in a particularly advantageous fashion. The hand-held instrument can also comprise at least one energy storage, more particularly a battery or a rechargeable battery. The hand-held instrument can more particularly comprise one or more operating elements for operating the hand-held instrument by the user and/or one or more display elements. Furthermore, the hand-held instrument can comprise one or more interfaces for communicating with other instruments, for example one or more interfaces for communicating with a computer or computer system.

The medical instrument has at least one code reader for reading out at least one item of information from an optical code of the medical consumable. The code reader comprises an image sensor with a plurality of sensors. Here, an optical code should be understood to mean an information carrier that can be read out by means of light in the visible and/or infrared and/or ultraviolet spectral range of the electromagnetic spectrum, more particularly a two- and/or three-dimensional barcode. Alternatively, or in addition thereto, numerous other types of optical code can also be implemented, for example one-dimensional barcodes, grayscale codes or similar types of optical codes or combinations of the aforementioned and/or other types of optical codes. By way of example, the optical code can be applied to a surface of the medical consumable and/or be connected to a support material of the medical consumable in another way; for example, it can be introduced into this support material. Hence, a surface can correspondingly also be understood to mean that the optical code is covered by at least one, at least partly optically transparent coating and hence it is still wholly or partly possible to read out said code. In any case, it should still be possible for the optical code to be read out from the outside by means of electromagnetic radiation of a suitable wavelength.

The code reader of the medical instrument comprises at least one optical multichannel evaluation unit, which, for brevity, is referred to as "image sensor" below. The image sensor in one embodiment comprises a plurality of sensors. These sensors, which can, for example, have a one- or two-dimensional structure, for example in a one- or two-dimensional sensor array, should be suitable for recording optical signals.

In a first aspect of the present invention, the medical instrument furthermore comprises at least one light source, which has an areal embodiment. This areal light source is designed to illuminate the optical code in a transmissive fashion. Here, a transmissive illumination should be understood to mean an illumination, in which the excitation light, emanating from the light source and travelling to the optical code, at least partly passes through a support material on which the optical code is applied and/or into which the optical code has been introduced. Thus, in particular, a transmissive illumination can comprise background illumination. By way of example, the light source can be arranged on a side of the optical code that is opposite to the image sensor. By way of example, if the optical code is connected to a support material of the consumable, for example if it is attached to this support material and/or introduced into this support material, the illumination brought about by the areal light source should be such that light emitted by the areal light source passes through the support material. The support material in one embodiment has a substantially planar design, for example in the form of a strip or in the form of an areal wall of the consumable. In this case, if the light emitted by the areal light source, which light is also referred to as excitation light below without restricting a possible type of interaction with the optical code and/or the support material, passes perpendicularly through the plane of the support material, which can also be the plane of the optical code. Thus, for example, the areal light source and the image sensor can be arranged on mutually opposite sides of the support material such that the excitation light passes substantially perpendicularly though the support material and/or the optical code. However, in principle, other embodiments are also possible, for example embodiments in which the excitation light is coupled into the support material from an oblique or lateral direction, then at least partly penetrates this support material and propagates within this support material over a certain path and/or is reflected once or a number of times, in order then finally to illuminate the optical code, for example to illuminate it from behind from the point of view of the image sensor. In principle, the light source and the image sensor can be arranged on the same side of the support material, particularly in the latter case. Exemplary embodiments of possible arrangements are explained in more detail below.

Here, contrary to a punctiform light source, an areal light source should, in general terms, be understood to mean a light source with a macroscopic planar extent, in one embodiment an extent of at least 1 $mm^2$, more particularly of at least 5 $mm^2$. This planar extent of the light source in one embodiment is at least 50% of a lateral extent of the optical code in a plane parallel to the areal light source. In a further embodiment, the areal light source has a luminous area, which corresponds to at least the area of the lateral extent of the optical code in a plane parallel to the area of the areal light source. Here the areal light source can also be composed of a plurality of individual areal light sources.

The areal light source can more particularly comprise a luminous film. Alternatively, or in addition thereto, the areal light source can have at least one electroluminescent light source, which can also be embodied as an electroluminescent luminous film. Here, an electroluminescent light source should be understood to mean a light source that comprises at least one material that can be excited to exhibit luminescence by electric means. By way of example, this excitation can be brought about by virtue of the fact that charge carriers are injected into the electroluminescent material or provided to the electroluminescent material from two or more electrodes, which charge carriers recombine within the electroluminescent material and/or within another material that is connected to the electroluminescent material such that the electroluminescent material is excited to emit light. Such electroluminescent materials can be inorganic and/or else organic. Thus, the prior art has disclosed a number of inorganic electroluminescent materials. Organic electroluminescent materials are for example known from organic light-emitting diode (OLED) technology. In one embodiment the areal light source comprises an electroluminescent film. Here, an electroluminescent film should be understood to mean an areal electroluminescent element, which is applied to a flexible support, such as a film in one embodiment. Such electroluminescent films, which are based on organic and/or else inorganic emitter materials, are commercially available in a variety of sizes. Use can also be made of a combination of a plurality of electroluminescent films.

In a particular embodiment the areal light source provides a luminous area which, as illustrated above, covers at least the area of the optical code. However, alternatively only a portion of the optical code can also be covered, for example in the case of redundant optical codes—this will be described in more detail below. Furthermore, in one embodiment the areal light source is at least 50% of the area of the image sensor, in another embodiment at least 70% and in a further embodiment at least 100%. In particular, the areal light source can be arranged relative to the image sensor in this case such that the luminous area of the areal light source is arranged parallel to the sensitive area of the image sensor and in one embodiment covers the sensitive area of the image sensor. Thus, the medical consumable with the optical code can be inserted, introduced or positioned in any other way between the image sensor, or the sensitive area of the image sensor, and the areal light source, with both a manual and an automatic introduction being possible.

In particular, the medical instrument can be designed such that it interacts with the medical consumable such that the image sensor lies directly on the optical code or is arranged in the direct vicinity of the optical code when the information from the optical code is read out. Here, "direct vicinity" should be understood to mean an arrangement in which the image sensor, or an active area of the image sensor, is not spaced further from the optical code than the lateral extent of the optical code itself or the lateral extent of the image sensor. In one embodiment the arrangement is brought about such that the distance between the image sensor, or the sensitive area thereof, and the optical code is no greater than five times a lateral extent of a sensor of the image sensor, in another embodiment no more than twice this and in a further embodiment no more than one times or less than the lateral extent of the sensor. In a particular embodiment the sensitive area of the image sensor lies directly on the optical code or on a support material, onto or into which the optical code has been applied or introduced.

In particular, the image sensor is able to capture the optical code without deflecting a beam path and without one or more optical elements being disposed therein. However, provision can equally be made for such optical elements. In principle, examples of such optical elements are any optical elements that are able to bring about an imaging property and/or a beam deflection of an image. Examples include lenses, prisms, optical fiber boards or the like. By way of example, one or more light-optical fiber boards can be provided between the image sensor and the consumable or the optical code. Here, a light-optical fiber board should be understood to mean an element comprising a plurality of optical fibers, all of which are in one embodiment aligned in parallel or substantially parallel. However, "substantially parallel" can also be understood to mean alignments which deviate from being parallel, for example by no more than 20°, and in one embodiment by no more than 5°. Within the scope of the present invention, an "optical fiber" should in this case be understood to mean an element that is transparent to light in the visible and/or infrared and/or ultraviolet spectral range and acts as an optical waveguide, particularly as a result of total internal reflection. By way of example, the light-optical fiber board can comprise such optical fibers as a bundle, with the optical fibers for example being molten, cast or bonded together. These optical fibers are arranged in one embodiment within the light-optical fiber board such that these are arranged as the densest packaging in at least one dimension such that the installation space is used to a greatest possible extent by the light-optical fibers. In respect of possible embodiments of light-optical fiber boards, reference can, in principle, be made to the prior art.

As illustrated above, the areal light source can more particularly comprise at least one electroluminescent light source. In a particular embodiment, the areal light source can provide a luminous area, which, as perceived from the outside, emits homogeneous light. In particular, in order to produce such a luminous area, in one embodiment a homogeneous luminous area, the light source can, in addition to one or more light emitters, also comprise further elements, which can interact in order to provide the luminous area. Thus, by way of example, the areal light source can also comprise at least one optical waveguide. By way of example, this can allow the provision of excitation light from, for example, an originally punctiform or non-areal light emitter, which excitation light illuminates a luminous area after passing through the optical waveguide. Here, in general, an optical waveguide should be understood to mean an element that can guide light based on the principle of total internal reflection. This can also expand light from e.g. a punctiform or linear emitter in order to illuminate, for example homogeneously illuminate, a luminous area. Here, a homogeneous illumination should be understood to mean an illumination in which the light intensities over the area preferably do not vary by more than 50%, more particularly by no more than 20% and even more particularly by no more than 10%.

As illustrated above, the medical instrument can more particularly comprise at least one positioning device. This positioning device can be designed to position the consumable and the medical instrument relative to one another, for example to allow optimum reading of the optical code. By way of example, the consumable can be wholly or partly insertable into a receptacle of the medical instrument, with the positioning device being connected to the receptacle or inserted into the receptacle. By way of example, the positioning device can be designed to position the medical instrument and the consumable relative to one another such that, in a read out position, optimum positioning of the image sensor relative to the optical code is ensured, for example an optimum distance and/or an optimum alignment. Alternatively, or in addition thereto, the positioning device can also be designed to ensure an unchanging distance at all times between the consumable, or the optical code, and the image sensor and/or other elements of the code reader, in particular in order to avoid incorrect positioning.

The code reader can furthermore be designed to carry out a time-resolved measurement. Thus, for example, the optical code and/or a support material, which is connected to the optical code, can have luminescent properties, more particularly fluorescent properties, wherein spectral components of the excitation light and/or of the luminescent light can be captured in a time-resolved fashion in order, for example, to improve the capture accuracy of the optical code. By way of example, different decay times of the luminescence can be used here.

The image sensor can capture the optical code without deflecting a beam path and without optical elements being disposed therein in the above-described first aspect of the invention, in which use is made of the areal light source. However, as explained above, provision can likewise be made for such optical elements. Thus, in a second aspect, a medical instrument is proposed for carrying out at least one medical function, which can for example be embodied as per the above-described medical instrument in one or more of the above-described variants. Once again, the medical instrument is designed to carry out at least one medical function and is designed to interact with at least one medical consumable in order to carry out the medical function. Once again, the medical instrument has at least one code reader for reading out at least one item of information from an optical code of the medical consumable, wherein the code reader comprises at least one image sensor with a plurality of sensors.

Furthermore, the code reader once again comprises at least one light source. Unlike the aforementioned first aspect of the present invention, the light source can also have an areal design in this second aspect of the present invention; however, it can also have a different design. The light source is designed to illuminate the optical code in a transmissive fashion. In respect of the possible embodiments of the transmissive illumination, reference can be made to the above description of the first aspect. The light source, more particularly the areal light source, is once again in one embodiment arranged on a side of the optical code that is opposite to the image sensor. However, alternatively, or in addition thereto, other arrangements of the light source are also possible, in which arrangements this light source illuminates the optical code in a transmissive fashion. By way of example, a light source can be arranged on the same side of the medical consumable as the image sensor. By way of example, in this case there can be lateral illumination, wherein the consumable and/or a support material of the consumable that is connected to the optical code is in one embodiment wholly or partly transparent to light and/or even has light-conducting properties. By way of example, a support material of the consumable can have diffuse light-conducting properties, and so illumination from the light source, coupled in laterally, reaches the optical code and illuminates the latter from behind and/or excites it from the rear side and/or transmits it. All options of a rear-side illumination of the optical code should be encompassed by the term "transmissive illumination".

Here, at least one deflection element is arranged between the optical code and the image sensor in this second aspect of the medical instrument, wherein the deflection element is designed to deflect a beam path at least once. Here, use can, in principle, be made of any deflection element, more particularly a mirror and/or a prism. The deflection element can be used to fold the beam path for capturing the optical code, in order to allow a space-saving embodiment of the medical instrument.

In terms of further points, the medical instrument as per this second aspect of the present invention can, in principle, be embodied as per the aforementioned description of the first aspect. Thus, more particularly, the medical instrument can once again be embodied such that the light source comprises an areal light source, more particularly a luminous film and/or an electroluminescent light source and in a particular embodiment an electroluminescent film. The areal light source can comprise further elements, more particularly at least one optical waveguide. Furthermore, the medical instrument can also comprise at least one positioning device, wherein reference can once again be made to the aforementioned description. Furthermore, the code reader can also be designed to carry out a time-resolved measurement. In respect of further possible embodiments, reference can be made to the above description of the first aspect of the present invention.

In addition to the medical instrument as per one or more of the above-described embodiments, a medical system is furthermore proposed, which comprises at least one medical instrument as per one or more of the above-described embodiments, be it according to the first aspect of the invention and/or according to the second aspect of the invention. Furthermore, the medical system comprises a medical consumable with at least one optical code. Reference can be made to the aforementioned description in respect of possible embodiments of this medical consumable.

In particular, the optical code can be connected to at least one support material of the medical consumable. By way of example, this connection can be brought about by virtue of the fact that the optical code is applied to the support material, e.g. printed on, and/or introduced into the support material, for example into a layered design of the support material or in another fashion.

Here, it is generally within the scope of the present invention for the support material to have light-conducting properties, more particularly diffuse light-conducting properties. In general, the support material should be at least partly transparent to excitation light from the light source of the medical instrument, more particularly from the areal light source of the medical instrument. Here the support material and/or the optical code can also comprise at least one light converter. By way of example, such a light converter can produce photons with a shorter wavelength from longer wavelength photons of the excitation light, for example within the scope of multi-photon processes. In general, a light converter should be understood to mean a material and/or element that is able to convert light with a first wavelength into light with a second wavelength, for example with a shorter wavelength or a longer wavelength. In other words, the light converter can for example comprise an up converter or a down converter, i.e. a converter that can convert light into higher-energy light or lower-energy light. By way of example, this light converter can be available in the form of a dye, a pigment, a phosphor or in a similar form. By way of example, the light converter can be excited by means of an appropriate excitation light, for example an excitation light emitted by the light source, which can be captured by the code reader and/or the image sensor in order to read out the information contained in the code. In general, the at least one item of information can be read out by virtue of the fact that, for example, excitation light from the light source is absorbed by the optical code, wherein, for example, an spatially-resolved absorption can be captured. Alternatively, or in addition thereto, there can also be an excitation of the optical code and/or surroundings of the optical code, for example of the support material. By way of example, the optical code can be designed such that it itself, as illustrated above, has luminescent properties, wherein the luminescence is excited by the excitation light. By way of example, this luminescence can comprise fluorescence and/or phosphorescence.

In a further embodiment, the optical code can also have a redundant design. Here, a redundant design should be understood to mean a design in which the at least one item of information is contained a number of times in the code in the same or in a similar fashion; for example, by virtue of the fact that the optical code, for example a barcode, comprises multiple regions with the same encoding. In this case, it suffices for the code reader, for example the image sensor, to capture merely one of these regions. In general, the optical code can be captured by the code reader in such a fashion that different regions are captured in succession or, in another embodiment, at the same time.

The medical instrument and the medical system in one or more of the above-proposed embodiments have a number of advantages over known medical instruments and medical systems. Thus, in particular, optical codes can be implemented with a high data density and can be captured with high data integrity. The data information can be uniquely associated with the utilized consumable. Thus, it is possible to avoid the risk of supplying erroneous measurement results, which could then possibly lead to incorrect medication.

Furthermore, there is no need for an additional operating process by the user. In principle, it is also possible to dispense with drive technology required for a read out process; however, this can be additionally provided as an option for increasing the comfort. Overall, this makes it possible to obtain a high reliability of the read out processes. At the same time, it is possible, in principle, to dispense with the use of electronic information carriers, such as radio frequency labels, wherein, however such electronic information carriers can, in principle, be additionally provided. In general, this can ensure a cost-effective production of medical consumables.

The aforementioned advantages can additionally be accentuated and developed by the aforementioned advantageous embodiments of the medical instrument and the medical system.

In respect of the aforementioned high data density and high data integrity, use can in particular be made of one- or two-dimensional barcodes, for example so-called data matrix codes. These have both a high data density and, for example as a result of the optional use of redundant and/or error correcting codes, a high data integrity. In order to achieve an even higher data density, the optical code, for example the barcode, can also have a three-dimensional design and/or be applied to the surface of the consumable in different spectral ranges and/or be introduced into the consumable, for example a support material of the consumable, in any other way. The use of multi-spectral illumination apparatuses and filters allows sequential reading out of the various spectral representations of the optical code, for example various barcode layers. Thus, for example, the above-described light source, more particularly the areal light source, can be designed to emit light in different spectral ranges. For this purpose the light source can for example comprise a number of individual light sources with different spectral properties. In principle, the various spectral representations can be recorded sequentially or else simultaneously in this case, for example using different sensors. The optical code, for example the barcode, can be read out by means of light in the visible and/or infrared and/or ultraviolet spectral range.

In respect of the above-described unique association, which should be listed as an important advantage of the proposed invention, it should be noted that this unique association emerges, in particular, from the fact that the optical code is connected to the consumable, for example to a support material of the consumable. Hence the consumable itself is inseparable and uniquely characterized. Thus, the consumable itself constitutes the data carrier or contains at least this data carrier.

In respect of the advantage that no further, additional operative actions by the user are required in order to make possible an identification of the consumable and/or reading out of the optical code or the information contained in this optical code, reference should, in particular, be made to the integration of the code reader into the medical instrument. The code reader itself is able to read the optical code, e.g. the barcode, when the consumable is inserted into the medical instrument or when the consumable is attached to, for example appended onto, the medical instrument. Here, the type and speed of the interaction between the medical instrument and the medical consumable is, in principle, irrelevant to the correct read out of the optical code. By way of example, the speed at which the medical consumable is inserted into and/or connected to the medical instrument plays a minor role. In particular, this can be achieved by using an optical line or areal sensor as image sensor, on which, as explained above, the optical code is in one embodiment imaged in its entirety, i.e. at once, by means of an optical beam path. The optical code in one embodiment is read as soon as the inserted or connected medical consumable is in a correct end position. Since, for example, the insertion of the consumable can be seen directly by the user, this therefore does not create an additional operative action either.

In respect of the high reliability without faulty reading processes, reference should be made to the fact that, in particular, mechanical tolerance in the insertion final position of the consumable is achieved by a redundant application of the optical code, e.g. the barcode. In particular, this can mean that all required modules of a barcode are always still imaged on the image sensor, for example on an areal sensor, even if the medical consumable was not inserted quite correctly and/or was not quite correctly connected to the medical instrument in another fashion.

As illustrated above, the reliability can furthermore be increased by virtue of the fact that extraneous-light effects and reflections are suppressed and/or avoided. Thus, as explained above, the support material and/or the optical code itself can contain a light converter, which converts the excitation light and/or the excited light into a different spectral range. Thus, for example, up converters and/or down converters can be contained. The support material and/or the optical code itself can likewise be designed to be wholly or partly fluorescent, for example have fluorescent properties, for example to make possible a temporally staggered response between a pulsed excitation light and a reflected light or a light emitted by the support material and/or the optical code.

Once again, as explained above, simultaneous illumination by excitation light with various wavelengths and the subsequent spectral separation by the image sensor, which can be sensitive in a plurality of spectral ranges, can be possible.

Furthermore, as explained above, the medical system and the medical instrument can be implemented in a very cost-effective and space-saving fashion. Thus, the areal light source in particular leads to a low installation height of the code reader. By way of example, this light source can bring about a transmissive illumination through an optical code, for example a barcode, applied to a transparent part of the consumable. In the process, as explained above, use can, for example, be made of a light-conducting system, for example a light-pipe and/or an installation-height reducing electroluminescent film. Furthermore, as illustrated above, a reduction in the installation height can also be achieved by a folded beam path.

In order to further improve reliability in terms of reading out the optical code, use can be made of the above-described positioning device. In particular, the latter can be used to position the medical consumable with respect to the light source and/or the image sensor and thus improve the reading of the optical code. In particular, the positioning device can contain at least one spacer in order to ensure an unchanging spacing between the optical code to be read and the light source and/or the image sensor. Alternatively, or in addition thereto, the positioning device can contain a pressure element in order, for example, to press the medical consumable and/or part of the medical consumable against a contact surface or another contact element. The positioning device can also have a modular design. In particular, the positioning device can be designed such that it can also be fitted to differently shaped medical consumables.

BRIEF DESCRIPTION OF THE FIGURES

Further details and features of the invention emerge from the following description of exemplary embodiments in conjunction with the dependent claims. Here, the respective features can be implemented individually or a number of them can be implemented together in a combination. The invention is not restricted to the exemplary embodiments. The exemplary embodiments are illustrated schematically in the figures. The same reference signs in the individual figures in this case denote the same or functionally equivalent elements, or elements that correspond to one another in terms of their functions.

DETAILED DESCRIPTION

Figure 1:
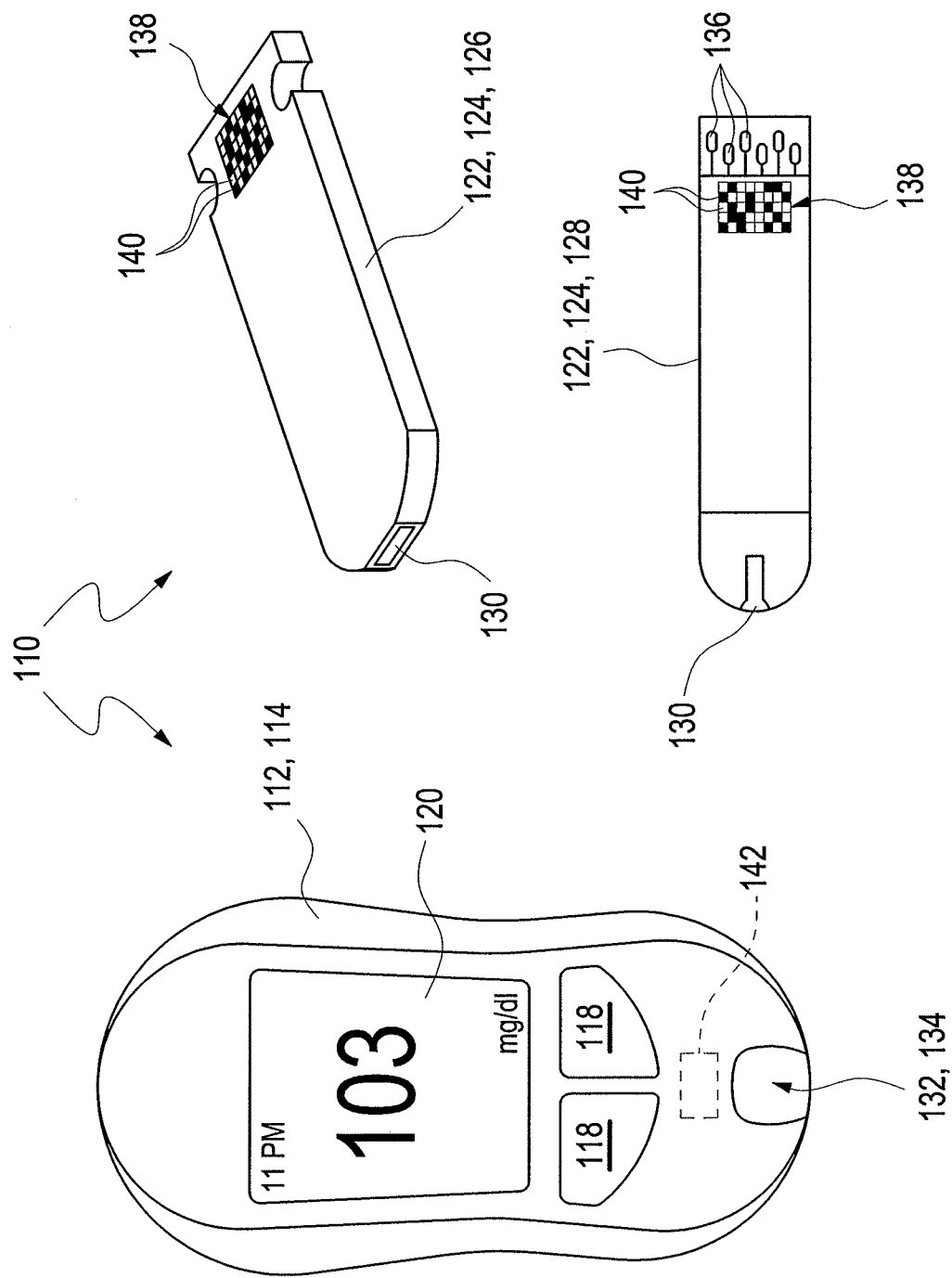
FIG. 1 shows a first exemplary embodiment of a medical system according to the invention with a blood-glucose measuring instrument.
Figure 2:
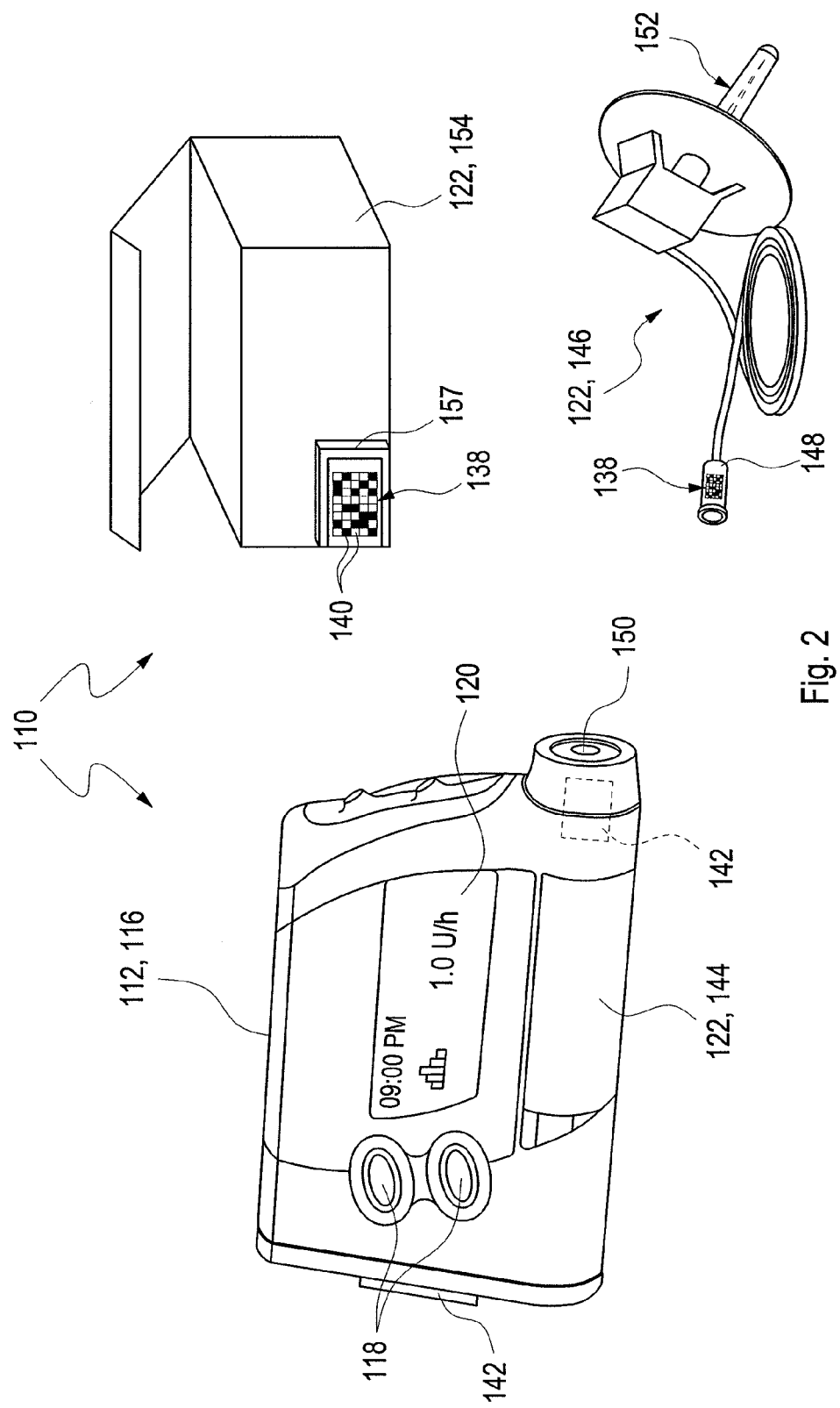
FIG. 2 shows a second exemplary embodiment of a medical system with an insulin pump and an infusion set.

FIGS. 1 and 2 illustrate two different embodiments of medical systems 110 in an exemplary fashion. Said systems respectively have one medical instrument 112 and at least one medical consumable 122. In FIG. 1, the medical instrument 112 is, in an exemplary fashion, embodied as a blood-glucose measuring instrument 114. In FIG. 2, the medical instrument 112 is, in an exemplary fashion, represented by an insulin pump 116. In general, the medical instrument 112 can be embodied such that provision is made for user interaction via input means 118 and/or output means 120. By way of example, output means 120 can comprise one or more displays for displaying e.g. measured values, set parameters or other items of information. Hence, the medical instrument 112 can constitute an interface of the medical system 110 to the user and/or provide such an interface.

The medical systems 110 illustrated in FIGS. 1 and 2 comprise one or more medical consumables 122. Thus, the blood-glucose measuring instrument 114 illustrated in FIG. 1 interacts with one or more test elements 124, which, in an exemplary fashion, are shown in FIG. 1 in two different embodiments. Thus, for example, the upper right image part of FIG. 1 shows a stiff test element 126 in a flat, elongate form. The lower image part, to the right in FIG. 1, by contrast shows a test element 124 in the form of a test strip 128. Both types of test element 124 can be used in the illustrated blood-glucose measuring instrument 114. It is likewise possible to use a majority of individual test elements 124, which are in a magazine (not illustrated), in a blood-glucose measuring instrument 114.

By way of example, both test elements 124 can have an application point 130 for applying a bodily fluid sample. This sample can be applied when a test element 124 is inserted into the blood-glucose measuring instrument 114 or, alternatively or in addition thereto, when a test element 124 is situated outside of the blood-glucose measuring instrument 114, for example in a different type of medical system 110 with a different design.

The blood-glucose measuring instrument 114 comprises an input opening 132, which can simultaneously serve as a positioning device 134 or as part of such a positioning device 134. This input opening 132 can allow interaction between the blood-glucose measuring instrument 114 and the test element 124 if the test element 124 is correctly inserted into the input opening 132.

By way of example, the sample applied to the application point 130 is evaluated in an optical and/or electrochemical fashion. By way of example, as illustrated in the test element 124 in the right lower image part of FIG. 1, provision can be made for electrode contacts 136, by means of which the test strip 128 can be contacted by the blood-glucose measuring instrument 114 when the test strip 128 is inserted into the blood-glucose measuring instrument 114.

Since the properties of the test elements 124 can change from batch to batch, it is suggested to apply an optical code 138 onto the test elements 124, which optical code can, in particular, have a high density. This optical code 138, illustrated symbolically in FIG. 1, can for example be embodied as a two-dimensional barcode, for example as a two-dimensional 35 bit barcode. The smallest units of such an optical code 138 are often also referred to as modules, and are denoted by reference sign 140 in FIG. 1. By way of example, these modules 140 are arranged in a 5×7 matrix in FIG. 1. However, it goes without saying that other embodiments are also possible. By way of example, the modules 140 differ from one another in terms of their grayscale value and/or color value in the wavelength range between 300 and 3000 nm, for example within the entire wavelength range between 300 and 3000 nm.

In order to be able to read the optical code 138, the medical instrument 112, more particularly the blood-sugar measuring instrument 114, comprises a code reader 142, which is merely indicated in FIG. 1. As soon as the test element 124 was correctly inserted into the positioning device 134 and/or already during the insertion of the test element 124 as well, the code reader 142 is able to read the applied optical code 138.

In addition to applying the optical code 138 onto a medical consumable 122, e.g. in the form of a test element 124, or as an alternative thereto, the optical code 138 can also be applied to packaging of the at least one medical consumable 122. In this case, the packaging, which is not illustrated in FIG. 1, should itself be considered to be a medical consumable 122. Such packaging can comprise one or more such medical consumables 122. In order to be able to read out such an optical code 138, the code reader 142 can, for example, also be wholly or partly applied to an outer side of the medical instrument 112, for example the blood-glucose measuring instrument 114, in order to be able to read out the optical code 138 while being borne by the packaging and/or when approaching the packaging. By way of example, the code reader 142 can in this case be embodied in the form of a borne reader.

In the medical system 110 illustrated in FIG. 2, three different embodiments of medical consumables 122 are illustrated in an exemplary fashion. Thus, an optical code 138 can be applied onto a medical consumable 122 in the form of an insulin cartridge 144 (not illustrated in FIG. 2). Alternatively, or in addition thereto, an optical code 138 can also be applied to a primary cartridge or packaging of a primary cartridge, from which primary cartridge insulin is filled into the insulin cartridge 144, and so this too can act as a medical consumable 122.

Additionally, FIG. 2 illustrates a medical consumable 122 in the form of an infusion set 146. This infusion set 146 contains a tubular cannula 148, which can be attached to an adapter 150 of the insulin pump 116, and also the actual cannula 152 for insertion into body tissue. As set forth above, e.g. a filling volume of the entire infusion set 146 and/or of parts thereof constitutes an essential parameter, which is required for "priming" the insulin pump 116. By way of example, at least one optical code 138 can once again be provided on e.g. the infusion set 146 itself and/or on packaging 154 of the latter, which itself can likewise be considered to be a medical consumable 122, for this purpose. This optical code 138 can in turn, analogously to the exemplary embodiment as per FIG. 1, be read by means of a code reader 142 of the insulin pump 116 such that the insulin pump 116 can use this information relating to the filling volume, and/or other information contained in the optical code, e.g. for a priming procedure. Other types of information can alternatively or additionally also be transmitted in this fashion.

In FIG. 2, the code reader 142 is symbolically arranged at one end of a housing of the insulin pump 116 and can for example, in order to read out the information, be borne by the optical code 138 on the packaging 154 and/or the infusion set 156, or be led into the vicinity of the optical code 138. The packaging 154 and/or another type of medical consumable 122 can also comprise at least one positioning aid 157 in order to make it easier for the code reader 142 to be borne and/or positioned, which positioning aid is indicated in FIG. 2 in an exemplary fashion in the form of a frame. However, in principle, other embodiments of the positioning aid 157 are also possible. By way of example, the positioning aid 157 can simplify relative positioning and/or alignment of the code reader 142 with respect to the optical code 138. Thus, for example, the positioning aid 157 can be used to set and/or fix lateral positioning of the code reader 142 relative to the optical code 138 and/or a spacing between the code reader 142 and optical code 138 and/or an angular alignment between the code reader 142 and the optical code 138 about at least one tilting angle. By way of example, the positioning aid 157 can comprise one or more contact areas and/or one or more contact edges and/or one or more spacers and/or one or more guides for this purpose.

As an alternative to the embodiments shown in FIG. 2, or in addition thereto, an optical code 138 can also be arranged at other points of the medical consumable 122 and be read out in a different fashion. By way of example, an optical code 138 can, alternatively or additionally, also be applied to a flattened, transparent end of the tubular cannula 148, which optical code can be read out by means of a code reader 142 attached in the interior of the medical instrument 112, e.g. of the insulin pump 116.

Figure 3:
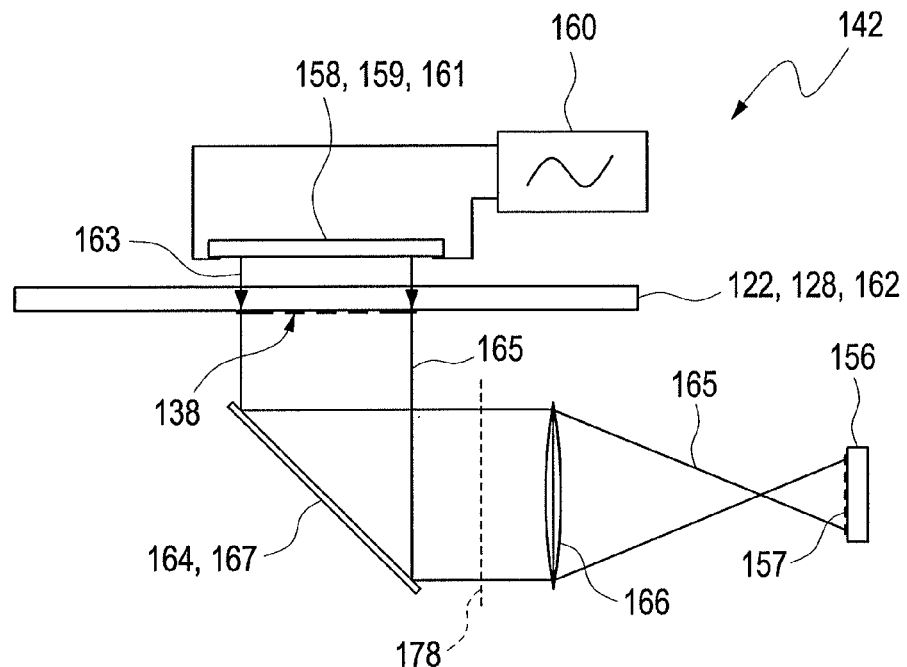
FIG. 3 shows an exemplary embodiment of a code reader working on a transmissive principle, with an areal light source.

FIG. 3 illustrates a first exemplary embodiment of a possible code reader 142, which can be used in a medical instrument 112. In the illustrated exemplary embodiment, the code reader 142 comprises at least one image sensor 156 with, in the illustrated embodiment, a plurality of individual sensors 157, which together e.g. form a sensitive area of the image sensor 156. By way of example, this image sensor 156 can be a one- or two-dimensional array of sensors 157, for example a CCD chip. Alternatively, or in addition thereto, use can also be made of other image sensors.

Furthermore, in the illustrated exemplary embodiment, the code reader 142 comprises a light source 159, which is embodied as an areal light source 161 in this example. In particular, this areal light source 161 can be wholly or partly embodied as illumination film 158 and/or comprise such an illumination film 158. In particular, this illumination film 158 can be an organic and/or inorganic electroluminescent film. As illustrated in FIG. 3, the areal light source 161 can more particularly have an area that is greater than the area of the optical code 138. In particular, the areal light source 161 can be arranged on a side of the optical code 138 that is opposite to the image sensor 156, for example on a side that is opposite to the test strip 128, as illustrated in an exemplary fashion in FIG. 3.

In the exemplary embodiment shown in FIG. 3, the optical code 138 can, for example, be applied to a support material 162, for example a support material of a test strip 128 and/or another type of test element 124. In particular, this support material 162 can have an optically transparent design, for example as a result of a suitable selection of materials and/or a very thin embodiment of the support material 162. The optical code 138 is transilluminated by means of the light source 159, which is connected via a voltage supply 160 and/or another type of energy supply. As a result of the areal design of the light source 159, an installation height of the light source 159 can be greatly reduced compared to conventional light sources.

The light transmitted through the support material 162 and the optical code 138, attached thereto or introduced therein, is guided to the image sensor 156. By way of example, this can be brought about by imaging the optical code 138 on the sensitive area of the image sensor 156, for example, as shown in FIG. 3, via a lens 166 and/or another form of an imaging optical element.

The light radiated onto the optical code 138 from the light source 159 can, independently of the interaction thereof with the optical code 138 and/or the support material 162, also be referred to as excitation light 163. The light between the optical code 138 and the image sensor 156 can also be referred to as detection light 165. By way of example, this detection light 165 can for example be or comprise transmitted excitation light 163 and/or other types of light, for example light that is directly emitted by the optical code 138 and/or the support material 162, for example luminescent light such as phosphorescent and/or fluorescent light. For this purpose, the optical code 138 and/or the support material 162 can for example comprise one or more luminescent materials, for example fluorescent materials, and/or materials, such as e.g. luminescent converters or the like, that influence the excitation light 162 and/or the detection light 165 in another fashion.

Furthermore, FIG. 3 shows an option in which the detection light 165 is routed over a folded beam path, i.e. where it does not propagate to the image sensor 156 in a straight line. Accordingly, at least one deflection element 167 is optionally provided in the beam path; in this case, it is represented by a mirror 164 in an exemplary fashion. Other types of deflection elements 167 can also be used as an alternative or in addition thereto. This at least one deflection element 167 also serves to reduce the installation space. As an alternative to the folded beam path, illustrated in FIG. 1, with merely one 45° mirror 164, or in addition thereto, use can also be made of other arrangements, for example beam paths in which the beams are partly reflected back into themselves or reflected back into themselves at a very small angle with respect to the original beam. This also makes it possible to greatly reduce the installation space.

Furthermore, additional optical elements can be provided in the code reader 142, which additional optical elements for example have imaging properties and/or properties that influence the beam path and/or the beam properties in another fashion. A filter 178 constitutes an example for this; it is indicated symbolically in FIG. 3. By way of example, this optical filter 178 can be arranged in the illumination path of the excitation light 163 and/or in the path of the detection light 165, i.e. upstream of the image sensor 156. A use of a plurality of optical filters is also possible.

Figure 4:
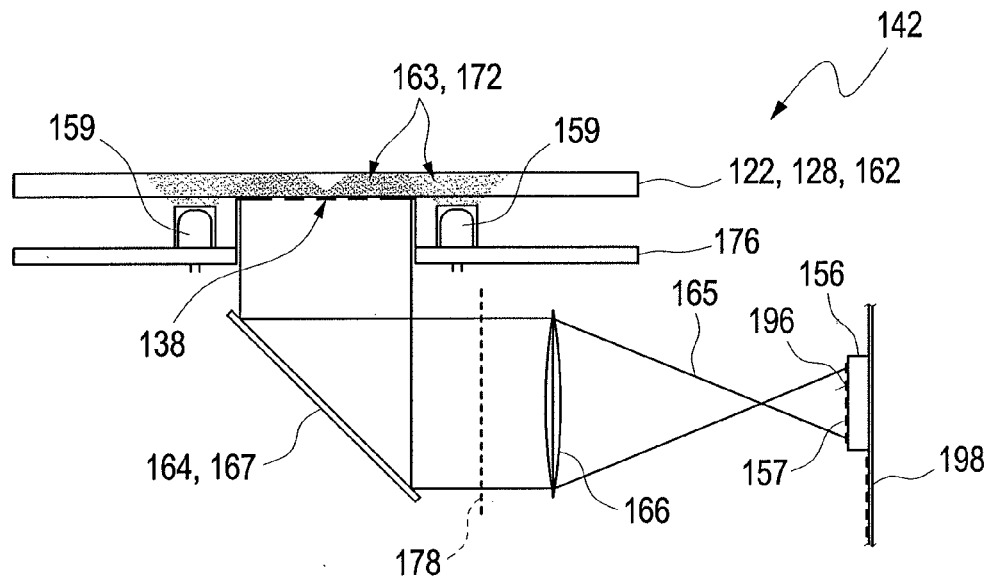
FIG. 4 shows a further exemplary embodiment of a code reader with transmissive illumination of the optical code using a light-conducting support material of a medical consumable.

A further possible embodiment of the code reader 142 is illustrated in FIG. 4. In this example, provision is in turn made for a light source 159; however, the latter need not necessarily be embodied as an areal light source. However, alternatively or additionally, use of areal light sources is also possible once again, for example to reduce an installation space.

In contrast to the exemplary embodiment as per FIG. 3, the light source 159 and an image sensor 156 are arranged on one and the same side of the optical code 138 in the illustrated exemplary embodiment as per FIG. 4. The optical code 138 in turn is applied to a support material 162 of a medical consumable 122, or inserted therein. However, in the illustrated exemplary embodiment, this support material need not necessarily be embodied in a fully transparent fashion, but can for example have diffuse light-conducting properties. By way of example, this can be a support material with a multiplicity of scattering centers, for example in the form of white particles. By way of example, these can be embodied such that they are able to reflect. A layered design that is able to reflect is also possible. Thus, this allows the provision of a support material 162 of the medical consumable 122, which support material can for example be designed in a transparent fashion or with at least partial light-scattering properties. However, other embodiments with these properties are also possible.

It can be gathered from FIG. 4 that one or more light sources 159 can be arranged to the side of the optical code 138. As a result, the excitation light 163 can be coupled into the support material 162 to the side of the optical code 138 and from there it can be routed and/or scattered in order to illuminate the optical code 138 from behind, i.e. to illuminate the latter in a transmissive fashion from the point of view of the image of the sensor 156. Hence the excitation light 163 can also be referred to as illumination light 172. The latter can penetrate into the support material 162 and be reflected again from there in order to illuminate the optical code 138 in a transmissive fashion.

Accordingly, there can be a detection of the light reflected by the optical code 138 and/or transillumination of the optical code 138, i.e. a detection of the transmitted light. Alternatively, or in addition thereto, the optical code 138 and/or modules 140 thereof can also, as illustrated above, have optical properties such as e.g. luminescent properties, conversion properties or the like. By way of example, to this end luminescent ink can be printed thereon and/or there can be a laser conversion of a dye or the like. Alternatively, or in addition thereto, the support material 162 can also have corresponding properties. By way of example, polyester can be used as a support material 162 with diffuse excitation-light 163 conducting properties, which polyester can also be doped, for example provided with a titanium dioxide doping such that the support material 162 in principle still gives a white impression.

Once again, an image of the optical code 138 is, in one embodiment, created on the image sensor 156. For this purpose, provision can optionally once again be made for one or more optical elements like e.g., as illustrated in FIG. 4, a lens 166. The beam path can once again be optionally folded in order to reduce installation space. For this purpose, provision can once again be made for at least one deflection element 167, analogously to FIG. 3, for example, once again, for one or more mirrors 164. Furthermore, one or more further optical elements can alternatively or additionally once again be introduced into the beam path of the excitation light 163 and/or of the detection light 165. By way of example, FIG. 4 once again shows a filter 178.

The optical code reader 142 illustrated in FIG. 4 can once again have a very compact design. By way of example, the at least one light source 159 can be arranged on a compact illumination printed circuit board 176. The optional folding of the beam path of the detection light 165, illustrated in FIG. 4, also contributes to the compactness of the code reader 142. In this exemplary embodiment, the code reader 142 can more particularly be designed as a borne reader and can for example be used to read optical codes 138 applied to packaging 154. However, in principle other embodiments and/or uses are also possible.

Figure 5:
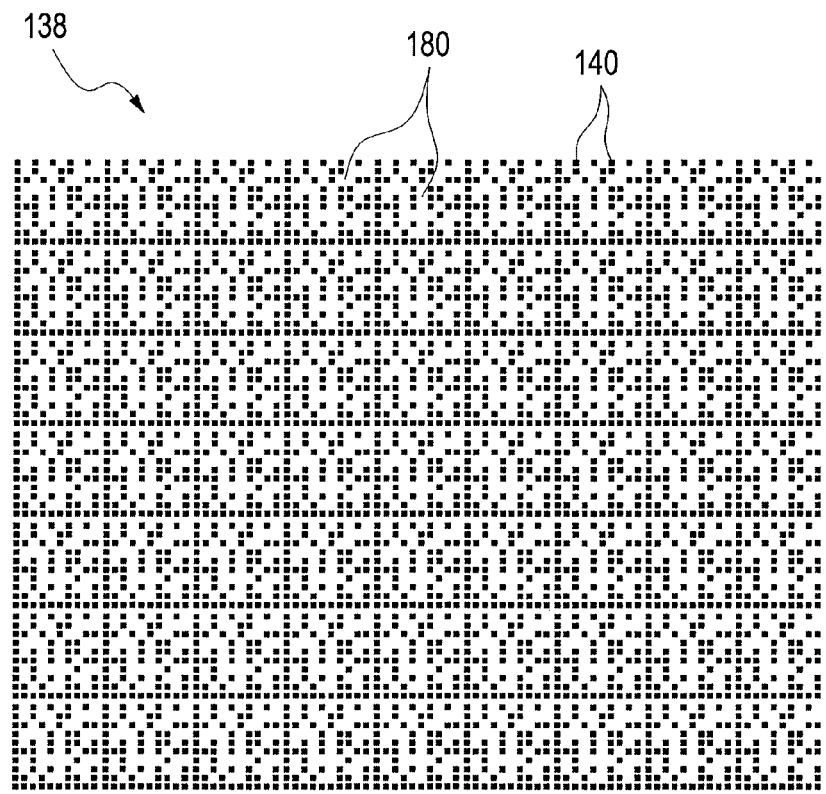
FIG. 5 shows an exemplary embodiment of a redundant optical code.

Furthermore, in general a complete image of the optical code 138 is imaged on the image sensor 156, for example an active sensor area 196 of the image sensor 156. By way of example, the active sensor surface 196 can be provided with a sufficient size for this purpose. However, in principle, other embodiments are also possible, for example embodiments in which merely part of the optical code 138 is imaged and/or captured by the image sensor 156. In this case, but in other cases as well, the optical code 138 can be embodied as a redundant optical code or can be embodied with redundant information. One example of such an embodiment is illustrated in FIG. 5. In this exemplary embodiment, the optical code has repeating, identical code units 180. These code units 180 are respectively embodied with the same pattern of modules 140, which can be captured. This makes it possible to read out the information contained in this optical code 138 even if the image sensor 156 merely captures a section of the optical code 138, and in one embodiment a section that comprises at least one complete code unit 180.

In general, the code reader 142 can already wholly or partly evaluate the information contained in the optical code 138, independently of an embodiment of the optical code 138. To this end, the image sensor 156 for example can be equipped with its own intelligence, which already allows a partial or complete evaluation of the optical code 138. By way of example, filters, image-identification algorithms or the like can already be implemented in the image sensor 156. In principle, further evaluation is also possible. The code reader 142 can, in another alternative or in addition thereto, also comprise additional electronic components, which furthermore completely or partly evaluate the optical code 138 in order to obtain the at least one item of information contained therein. By way of example, these additional components can, in addition to the image sensor 156, be arranged on a sensor printed circuit board 198, indicated in FIG. 4, or else they can be arranged separately. The sensor printed circuit board 198 can partly or wholly also have an identical design to the illumination printed circuit board 176. In another alternative or in addition thereto, a further evaluation can also be wholly or partly undertaken by a control unit of the medical instrument 112, for example by a central control unit of a blood-glucose measuring instrument 114 and/or of an insulin pump 116. Various embodiments are possible.

The explanation of the above exemplary embodiments was brought about such that the illumination of the optical code 138 by means of the light source 159 was static. However, this need not necessarily be the case, but there can also, alternatively or additionally, be a time-resolved illumination and/or measurement. An exemplary embodiment of such a dynamic or time-resolved measuring scheme is shown symbolically in FIG. 6. However, numerous further measuring schemes are also possible.

Figure 6:
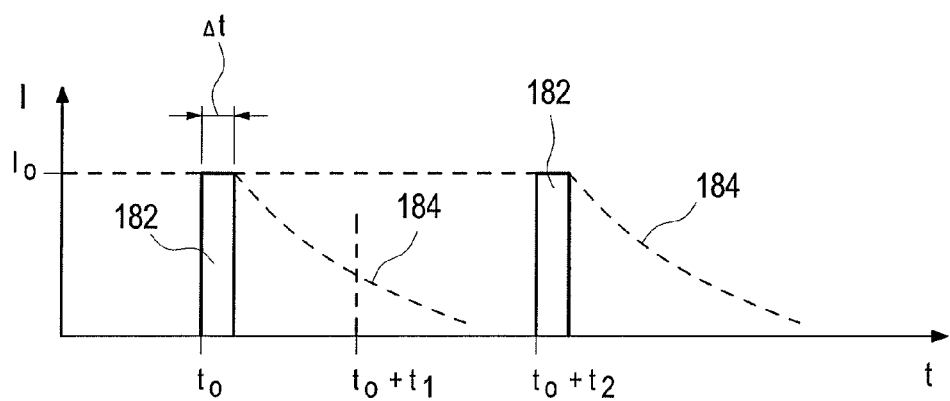
FIG. 6 shows an exemplary embodiment of a possible time-resolved measuring scheme.

In FIG. 6, the intensity I of the excitation light 163 is plotted over time. This makes it possible to identify that an illumination pulse 182 with an intensity $I_0$ is emitted at a time $t_0$. As indicated by dashed lines in FIG. 6, this illumination pulse 182 can for example excite a dye of the optical code 138 to exhibit afterglow 184, which lasts longer than the actual duration $\Delta t$ of the illumination pulse 182. By way of example, this afterglow 184 can comprise luminescence, for example phosphorescence.

At a time $t_0+t_1$, where $t_1 > \Delta t$, the detection light 165 in the form of the afterglow 184 can then be sampled by the image sensor 156. By way of example, this can be brought about by a corresponding "gate" in an electronic actuation of the image sensor 156, which is triggered by the illumination pulse 182. Although not illustrated in FIG. 6, this image recording can also once again take place over a certain amount of time such that a sufficient amount of detection light 165 can be recorded by the image sensor 156. As a result of this, the temporal measuring scheme shown in FIG. 6 can separate the excitation light 163 from the illumination pulse 182 from the detection light 165 in the form of the afterglow 184 by means of an excitation-response measuring method, as a result of which the signal-to-noise ratio and a background suppression can be greatly improved.

The measuring method can also be carried out repeatedly, which is likewise indicated in FIG. 6. Thus, the illumination pulse 182 can be repeated at a time $t_0+t_2$, where $t_2 > t_1$. By way of example, this can bring about periodic illumination. By way of example, this allows the measuring scheme to be carried out periodically such that a frequency-selective evaluation is also possible, for example by means of a so-called lock-in method.

Figure 7:
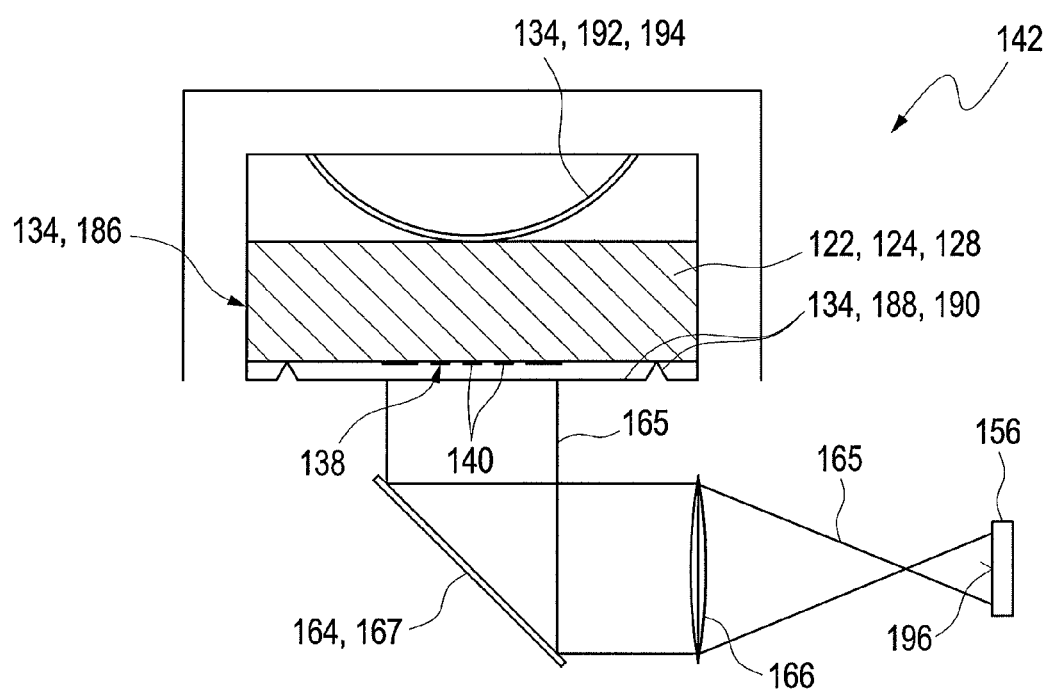
FIG. 7 shows a further exemplary embodiment of a code reader with a positioning device.

FIG. 7 shows an exemplary embodiment of a possible positioning device 134 in a schematic illustration. Here, the code reader 142 can for example be embodied largely like the code reader 142 described in the preceding exemplary embodiments and so reference can be made to the description above in respect of possible examples. No light source 159 is illustrated in FIG. 7. By way of example, the illumination can once again be brought about as per the above-described exemplary embodiments. Thus, for example, a light source 159, e.g. an areal light source 161, can be provided on a side of the optical code 138 that is opposite to the image sensor 156 and/or a light source 159 can be provided on the same side as the optical image sensor 156.

In the exemplary embodiment illustrated in FIG. 7, the positioning device 134 optionally comprises a slot 186, into which the medical consumable 122 can be inserted. By way of example, this medical consumable 122 can once again be a test element 124, for example a test strip 128. However, once again, other types of medical consumables 122 are also possible, wherein the positioning device 134 can be matched to the geometric shape of these consumables 122. Thus, for example, the slot 186 can be replaced by appropriate other types of holders and/or similar devices.

The positioning device 134 furthermore optionally comprises a spacer 188 in the exemplary embodiment illustrated in FIG. 7. By way of example, this spacer 188 comprises a distance rail 190, which is designed to ensure a prescribed minimum spacing between the medical consumable 122 and the image sensor 156.

Furthermore, the positioning device 134 in the exemplary embodiment illustrated in FIG. 7 can optionally have a pressure element 192, which is indicated here as a spring element 194 in an exemplary fashion. This pressure element 192 applies a force, in the direction of the image sensor 156, on the medical consumable 122. This is how the medical consumable 122 is pressed against the distance rail 190, and so it is ensured that the spacing between the medical consumable 122 and the image sensor 156 does not exceed a desired maximum spacing. However, in principle, other embodiments of the positioning device are also possible, in particular embodiments which ensure that the optical code 138 and the image sensor 156, or the active sensor area 196 thereof, are positioned within a predetermined spacing with respect to one another.

As illustrated above, in one embodiment the light source 159 comprises an areal light source 161. This areal design of the light source 159 can be brought about in various ways. Firstly, use can be made of auto-luminescent elements, such as e.g. the above-described illumination film 158. However, areal light sources 161 that give an impression of an illuminated area can also be realized in a different fashion.

Although embodiments of the invention have been described using specific terms, such description is for illustrative purposes only, and it is to be understood that changes and variations obvious to the skilled artisan are to be considered within the scope of the claims that follow and their equivalents.

| | List of reference signs |
|---|---|
| 110 | Medical system |
| 112 | Medical instrument |
| 114 | Blood-glucose measuring instrument |
| 116 | Insulin pump |
| 118 | Input means |
| 120 | Output means |
| 122 | Medical consumable |
| 124 | Test element |
| 126 | Stiff test element |
| 128 | Test strip |
| 130 | Application point |
| 132 | Input opening |
| 134 | Positioning device |
| 136 | Electrode contacts |
| 138 | Optical code |
| 140 | Modules |
| 142 | Code reader |
| 144 | Insulin cartridge |
| 146 | Infusion set |
| 148 | Tubular cannula |
| 150 | Adapter |
| 152 | Cannula |
| 154 | Packaging |
| 156 | Image sensor |
| 157 | Positioning aid |
| 157 | Sensor |
| 158 | Illumination film |
| 159 | Light source |
| 160 | Voltage supply |
| 161 | Areal light source |
| 162 | Support material |
| 163 | Excitation light |
| 164 | Mirror |
| 165 | Detection light |
| 166 | Lens |
| 167 | Deflection element |
| 176 | Illumination printed circuit board |
| 178 | Filter |
| 180 | Code units |
| 182 | Illumination pulse |
| 184 | Afterglow |
| 186 | Slot |
| 188 | Spacer |
| 190 | Distance rail |
| 192 | Pressure element |
| 194 | Spring element |
| 196 | Active sensor area |
| 198 | Sensor printed circuit board |

What is claimed is:

1. A medical instrument for carrying out at least one medical function, wherein the medical instrument is operable to interact with at least one medical consumable in order to carry out the medical function, wherein the medical instrument has at least one code reader for reading out at least one item of information from an optical code of the medical consumable, wherein the code reader comprises at least one image sensor, wherein the code reader furthermore comprises at least one areal light source, wherein the areal light source has a planar extent of at least 1 $mm^2$, wherein the areal light source is operable to illuminate the optical code in a transmissive fashion.

2. The medical instrument of claim 1, wherein the medical instrument is configured as a hand-held instrument.

3. The medical instrument of claim 1, wherein the areal light source comprises at least one luminous film.

4. The medical instrument of claim 1, wherein the areal light source comprises at least one electroluminescent light source.

5. The medical instrument of claim 1, wherein the areal light source comprises an electroluminescent film.

6. The medical instrument of claim 1, wherein the medical instrument is operable to interact with the medical consumable with the image sensor arranged in the direct vicinity of the optical code when the information from the optical code is read out.

7. The medical instrument of claim 1, wherein the medical instrument is operable to interact with the medical consumable with the image sensor arranged to lie directly on the optical code when the information from the optical code is read out.

8. The medical instrument of claim 1, wherein the image sensor is configured to read the optical code without deflecting a beam path and without optical elements being disposed in the beam path.

9. A medical instrument for carrying out at least one medical function, wherein the medical instrument is operable to interact with at least one medical consumable in order to carry out the medical function, wherein the medical instrument has at least one code reader for reading out at least one item of information from an optical code of the medical consumable, wherein the code reader comprises at least one image sensor, wherein the code reader furthermore comprises at least one light source, wherein the light source is configured to illuminate the optical code in a transmissive fashion, wherein at least one deflection element is arranged between the optical code and the image sensor, wherein the deflection element is configured to deflect a beam path at least once, wherein the light source comprises an areal light source.

10. The medical instrument of claim 9, wherein the areal light source is a luminous film.

11. The medical instrument of claim 9, wherein the areal light source is an electroluminescent light source.

12. The medical instrument of claim 9, wherein the areal light source is an electroluminescent film.

13. The medical instrument of claim 9, wherein the deflection element is selected from the group of deflection elements consisting of: a mirror and a prism.

14. The medical instrument of claim 9, wherein the areal light source is arranged on a side of the optical code that is opposite to the image sensor.

15. The medical instrument of claim 9, wherein the areal light source comprises an optical waveguide.

16. The medical instrument of claim 9, further comprising at least one positioning device for positioning the optical code of the medical consumable in a predetermined position relative to the code reader.

17. The medical instrument of claim 9, wherein the code reader is operable to carry out a time-resolved measurement.

18. A medical system, comprising:
at least one medical consumable with at least one optical code; and
a medical instrument operable to interact with the at least one medical consumable in order to carry out a medical function, wherein the medical instrument has at least one code reader for reading out at least one item of information from the optical code of the medical consumable, wherein the code reader comprises at least one image sensor, wherein the code reader furthermore comprises at least one areal light source, wherein the areal light source has a planar extent of at least 1 mm$^2$, wherein the areal light source is operable to illuminate the optical code in a transmissive fashion.

19. The medical system of claim 18, wherein the optical code is connected to at least one support material of the medical consumable, wherein the support material has light-conducting properties.

20. The medical system of claim 19, wherein the optical code is applied to the support material.

21. The medical system of claim 19, wherein the support material includes diffuse light-conducting properties.

22. The medical system of claim 18, wherein the optical code is connected to at least one support material of the medical consumable, wherein at least one of the support material and the optical code comprises a light converter.

23. The medical system of claim 22, wherein the optical code is applied to the support material.

24. The medical system of claim 18, wherein the optical code is connected to at least one support material of the medical consumable, wherein at least one of the support material and the optical code have luminescent properties.

25. The medical system of claim 24, wherein the luminescent properties include fluorescent properties.

26. The medical system of claim 24, wherein the optical code is applied to the support material.

27. The medical system of claim 18, wherein the optical code has a redundant design.

28. The medical system of claim 18, wherein the medical instrument is configured as a hand-held instrument.

29. The medical system of claim 18, wherein the areal light source comprises at least one luminous film.

30. The medical system of claim 18, wherein the areal light source comprises at least one electroluminescent light source.

31. The medical system of claim 18, wherein the areal light source comprises an electroluminescent film.

32. The medical system of claim 18, wherein the medical instrument is operable to interact with the medical consumable with the image sensor arranged in the direct vicinity of the optical code when the information from the optical code is read out.

33. The medical system of claim 18, wherein the medical instrument is operable to interact with the medical consumable with the image sensor arranged to lie directly on the optical code when the information from the optical code is read out.

34. The medical system of claim 18, wherein the image sensor is configured to read the optical code without deflecting a beam path and without optical elements being disposed in the beam path.

35. A medical system, comprising:
at least one medical consumable with at least one optical code; and
a medical instrument operable to interact with the at least one medical consumable in order to carry out a medical function, wherein the medical instrument has at least one code reader for reading out at least one item of information from the optical code of the medical consumable, wherein the code reader comprises at least one image sensor, wherein the code reader furthermore comprises at least one areal light source, wherein the areal light source is configured to illuminate the optical code in a transmissive fashion, wherein at least one deflection element is arranged between the optical code and the image sensor, wherein the deflection element is configured to deflect a beam path at least once.

36. The medical system of claim 35, wherein the optical code is connected to at least one support material of the medical consumable, wherein the support material has light-conducting properties.

37. The medical system of claim 36, wherein the optical code is applied to the support material.

38. The medical system of claim 36, wherein the support material includes diffuse light-conducting properties.

39. The medical system of claim 35, wherein the optical code is connected to at least one support material of the medical consumable, wherein at least one of the support material and the optical code comprises a light converter.

40. The medical system of claim 35, wherein the optical code is connected to at least one support material of the medical consumable, wherein at least one of the support material and the optical code have luminescent properties.

41. The medical system of claim 40, wherein at least one of the support material and the optical code includes fluorescent properties.

42. The medical system of claim 35, wherein the optical code has a redundant design.

43. The medical system of claim 35, wherein the areal light source is a luminous film.

44. The medical system of claim 35, wherein the areal light source is an electroluminescent light source.

45. The medical system of claim 35, wherein the areal light source is an electroluminescent film.

46. The medical system of claim 35, wherein the deflection element is selected from the group of deflection elements consisting of: a mirror and a prism.

47. The medical system of claim 35, wherein the areal light source is arranged on a side of the optical code that is opposite to the image sensor.

48. The medical system of claim 35, wherein the areal light source comprises an optical waveguide.

49. The medical system of claim 35, further comprising at least one positioning device for positioning the at least one optical code of the medical consumable in a predetermined position relative to the code reader.

50. The medical system of claim 35, wherein the code reader is operable to carry out a time-resolved measurement.

* * * * *